US012681602B1

(12) United States Patent
Fan et al.

(10) Patent No.: US 12,681,602 B1
(45) Date of Patent: Jul. 14, 2026

(54) TOUCH INPUT PROCESSING WITH DYNAMIC MERGE DETECTION

(71) Applicant: STMicroelectronics International N.V., Geneva (CH)

(72) Inventors: Bin Fan, Beijing (CN); Pengcheng Wen, Beijing (CN); Yue Ding, Beijing (CN); Da Man, Beijing (CN)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 19/016,813

(22) Filed: Jan. 10, 2025

(51) Int. Cl.
*G06F 3/041* (2006.01)

(52) U.S. Cl.
CPC .................... *G06F 3/04166* (2019.05); *G06F 2203/04104* (2013.01)

(58) Field of Classification Search
None
See application file for complete search history.

(56) References Cited

U.S. PATENT DOCUMENTS

| | | | | |
|---|---|---|---|---|
| 11,301,099 B1 * | 4/2022 | Shahsavari | ........... | G06F 3/0445 |
| 2011/0169763 A1 * | 7/2011 | Westerman | ............. | G06T 7/155 345/173 |

| | | | | |
|---|---|---|---|---|
| 2012/0113017 A1 * | 5/2012 | Benko | ................. | G06F 3/04186 345/173 |
| 2013/0016103 A1 | 1/2013 | Gossweiler, III et al. | | |
| 2015/0378497 A1 * | 12/2015 | Ningrat | ................... | G06F 3/044 345/174 |
| 2016/0098148 A1 * | 4/2016 | Gandra | ..................... | G06T 1/20 345/173 |
| 2016/0306449 A1 | 10/2016 | de los Reyes | | |
| 2020/0019269 A1 | 1/2020 | Jeon et al. | | |

FOREIGN PATENT DOCUMENTS

| | | |
|---|---|---|
| CN | 104951135 A | 9/2015 |

* cited by examiner

*Primary Examiner* — Krishna P Neupane
(74) *Attorney, Agent, or Firm* — Slater Matsil, LLP

(57) ABSTRACT

A method for operating an electronic device. The method includes detecting a plurality of touch inputs for a plurality of frames on a touchscreen of the device. The plurality of touch inputs includes a first touch input and a second touch input. The first touch input is immediately adjacent to the second touch input from amongst the plurality of touch inputs and the plurality of frames comprising a current frame and a preceding frame. The method further includes determining a distance between the first and the second touch inputs on the current frame, determining a speed between the first touch input on the current frame and the first touch input on the preceding frame, and merging, for the current frame, the first touch input with the second touch input into a single touch input based on the determined distance and the determined speed.

21 Claims, 9 Drawing Sheets

300

310

320

500

510

800

801 — Detect plurality of touch inputs for multiple frames

803 — Determine distance between adjacent touch inputs on current frame

805 — Determine speed between adjacent touch inputs of current and previous frame 807 — Merge adjacent touch inputs based on distance and speed

TOUCH INPUT PROCESSING WITH DYNAMIC MERGE DETECTION

TECHNICAL FIELD

The present invention relates generally to an electronic device and method of operating the same, and, in particular embodiments, to a touchscreen device and a method of operating a touchscreen device.

BACKGROUND

Touchscreens are commonly used in electronic devices, such as tablets, smartphones, wearable devices, and computers. In recent years, there has been a push away from the more traditional methods, as consumers prefer the convenience of portable devices that can support a more flexible lifestyle. To this end, there has been a rise in smaller, portable, hand-held electronic devices, such as mobile phones, tablets, gaming systems, and others. This has given rise to the popularity of touch screens and touch panel displays with larger screens that remain portable. Not only do they provide the functionality of the traditional electronic devices, but touch screens provide additional features.

In typical capacitive touchscreens, a touch event is generally determined to be triggered by a finger or a palm of the user according to an area size of a press or touch by the user. Touchscreen devices use capacitive touchscreens that work by sensing electrical charge from a touch input or finger touch. Capacitive touch sensing has become one of the means of detecting a user's touch on such devices. Since the human body is a good conductor, when a portion of the human body (e.g., a fingertip) approaches a capacitive touchscreen, a capacitance generated between a transparent electrode of the capacitive touchscreens and the human body can vary due to an electrostatic effect. By measuring a capacitance variation of a sensing line on the capacitive touch panel, a position of a touch point is determined.

SUMMARY

In an embodiment, a method of operating an electronic device includes: detecting a plurality of touch inputs for a plurality of frames on a touchscreen of the device, the plurality of touch inputs comprising a first touch input and a second touch input, the first touch input being immediately adjacent to the second touch input from amongst the plurality of touch inputs, the plurality of frames comprising a current frame and a preceding frame; determining a distance between the first and the second touch inputs on the current frame; determining a speed between the first touch input on the current frame and the first touch input on the preceding frame; and merging, for the current frame, the first touch input with the second touch input into a single touch input based on the determined distance and the determined speed.

In an embodiment, a method includes: detecting a first touch input and a second touch input on a first frame, the first touch input being proximate to the second touch input; detecting the first touch input and the second touch input on a second frame; assigning merge IDs to the first touch input and the second touch input of the second frame; determining that the merge ID of the first touch input and the merge ID of the second touch input have a same merge ID; determining that a first speed of the first touch input between the first frame and the second frame is less than a first speed threshold; determining that a second speed of the second touch input between the first frame and the second frame is less than a second speed threshold; determining that a distance between the first touch input and the second touch input on the second frame is less than a distance threshold; and merging the first touch input and the second touch input on the second frame based on determining the merge ID, the first speed, the second speed, and the distance.

In an embodiment, a device includes a touchscreen, a touch controller, and a non-transitory memory storing a program to be executed by the touch controller. The program includes instructions to: detect a plurality of touch inputs for a plurality of frames on the touchscreen; record the plurality of touch inputs on a touch bitmap for each frame of the plurality of frames, each touch input having a touch island on the touch bitmap; assign merge IDs to each of the touch islands on the touch bitmap for each frame; determine that the touch islands in a current frame have a same merge ID; determine that a speed between the touch inputs on the current frame and the touch inputs on a previous frame is less than a speed threshold; determine that a distance between the touch inputs on the current frame is less than a distance threshold; and merge the touch inputs in response to the touch islands having the same merge ID, the speed being less than the speed threshold, and the distance being less than the distance threshold.

Other embodiments and variations are described herein.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Embodiments of the present disclosure can enhance touch input processing when multiple touches occur in close proximity on a touchscreen. Embodiments of the present disclosure can reduce coordinate jitter and improve touch response stability in touchscreen devices. In accordance with various embodiments, techniques and systems are provided for processing and managing multiple touch inputs on a touchscreen. Various embodiments of the present disclosure provide techniques for dynamically merging and splitting touch inputs based on overlap percentages, movement speeds, and distances between touches across multiple frames.

Modern touchscreen applications may need precise and stable touch coordinates reporting, for example, in gaming and other interactive uses. When users interact with touchscreens using multiple fingers in close proximity, consistent coordinate reporting can provide optimal touch performance. For example, when multiple fingers contact or slide slowly across the same general area of a touchscreen, the touch controller may alternately report the touch inputs as either a single merged coordinate or as separate touch coordinates.

The reporting of touch inputs can become unstable when multiple touch inputs are positioned close together on the touchscreen. In some cases, touches that should be merged into a single coordinate may be incorrectly reported as separate coordinates. The instability in touch reporting can occur during both stationary multi-finger touches and slow sliding movements across the touchscreen. Inconsistent touch coordinate reporting may degrade touch responsiveness and overall user experience.

Touch processing techniques that enhance coordinate stability and reduce position jitter can improve touch performance. By implementing merge criteria for merging proximate touches based on movement characteristics and spatial relationships, the touch controller can provide consistent and stable touch coordinate reporting. Enhanced touch merging algorithms allow for proper consolidation of close touches while maintaining the ability to accurately track separate touches when appropriate. The accuracy of multiple touch input detection can be improved by detecting and tracking multiple touch inputs across sequential frames, determining when to merge proximate touches based on multiple criteria including touch overlap percentages, touch input speeds, and distances between touches.

Figure 1A:
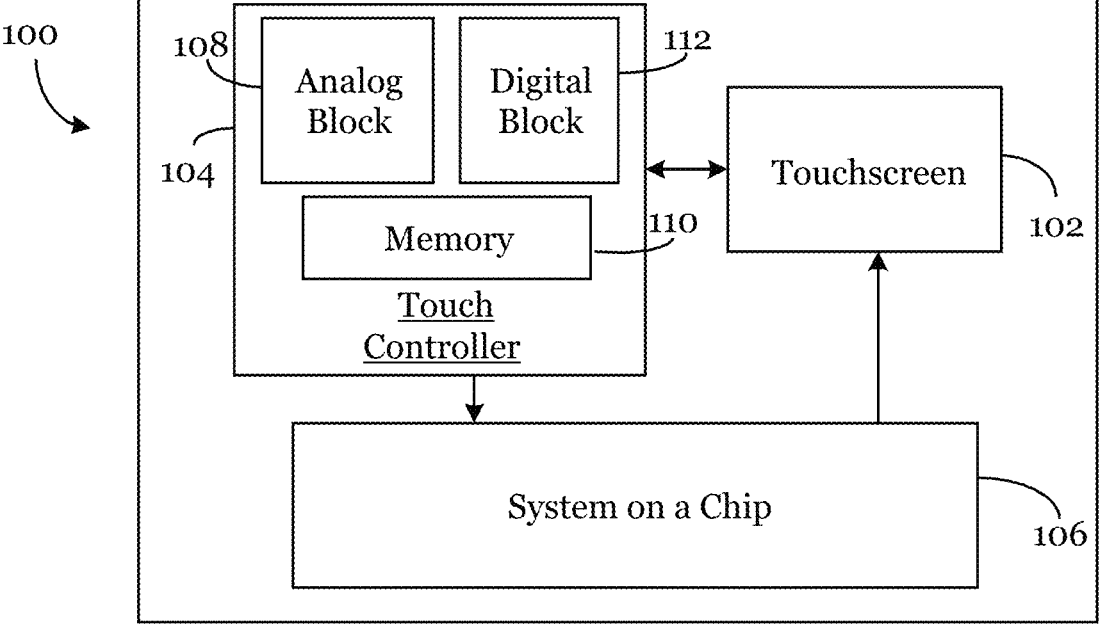
FIGS. 1A-1B illustrate a component schematic of an electronic device according to an embodiment of the present application.
Figure 1B:
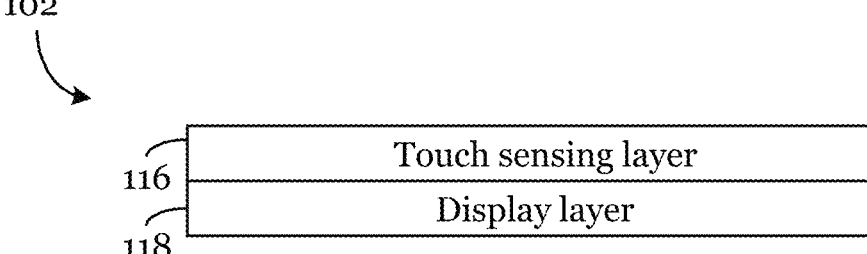

FIGS. 1A-1B illustrate a component schematic of an electronic device according to an embodiment of the present application.

Referring to FIG. 1A, an electronic device 100 may include a touchscreen 102, a touch controller 104, and a system on a chip 106. The electronic device 100 may be a smart phone, a GPS device, a tablet computer, a mobile media player, a laptop, a gaming system, a personal computer, wearable device, or any other electronic device that may utilize touch sensitive display.

While the inventive aspects are described primarily in the context of touchscreen displays in mobile devices and smartphones, it should also be appreciated that these inventive aspects may also apply to other touch-enabled electronic devices and systems. In particular, aspects of this disclosure may similarly apply to tablets, laptops, monitors, kiosks, point-of-sale terminals, automotive displays, industrial control panels, gaming devices, and other touch interface implementations.

The touchscreen 102 may be an organic light emitting diode (OLED) display, an LED display, or any other type of display. The touchscreen 102 may include a plurality of pixels in a display layer configured to display an image. As understood by those with ordinary skill in the art, the display layer of the touchscreen 102 may include of the plurality of pixels positioned at each of the intersections between the data lines and scan lines. The plurality of scan lines may extend across the rows of the touchscreen 102, and data lines that extend across the columns of the touchscreen 102 in a matrix like formation. The touchscreen 102 may also include a touch sensing layer configured to detect touch inputs made on the touchscreen 102. This will be shown in more detail below.

The touch controller 104 may perform various methods with respect to the display. In various embodiments, the touch controller 104 may be a processor that analyzes information and carries out a series of executable scripts, e.g., stored in a memory 110. In one or more embodiments, the processor may comprise an application-specific integrated circuit (ASIC) device, a central processing unit (CPU), or any other processing unit known in the art. In various embodiments, the touch controller 104 may comprise a number of separate computing units such as cores integrated within one processor, or distinct separate processing chips. Further details regarding how the touch controller 104 accounts for water on the touchscreen 102 are provided below.

In various embodiments, the touch controller 104 may include an analog block 108 and a digital block 112. The analog block 108 may include a plurality of analog circuits configured to measure capacitances across touchscreen 102 and convert them into digital values. The digital block 112 may comprise a variety of digital logic circuits such as DACs or digital control systems configured to obtain digital touch data from the analog block 108, process the digital touch data and store them into memory 110.

The memory 110 may be configured to store data and instructions for the touch controller 104 and may comprise various programs to be executed by the touch controller 104. The memory 110 may include a non-transitory computer readable medium that stores instructions for execution by the touch controller 104. The memory 110 may comprise both volatile and non-volatile components to support temporary data storage during processing and long-term storage of system software and calibration data. The volatile memory, typically RAM, provides fast access for temporary storage of sensor data, intermediate results, and current state information for a gesture recognition system. The non-volatile memory, such as Flash or EEPROM, can store information such as the device's firmware, gesture recognition algorithms, and sensor calibration data.

In various embodiments, the system on a chip 106, may also be known as an application processor, and may comprise a processor, interface, circuitry, and/or the like configured to direct the flow of input and output data to the touchscreen 102 and the associated touch controller 104. The system on a chip 106 may be configured to receive touch event data from the touch controller 104 and interpret the touch event data based on a user interface or application displayed on the touchscreen 102.

Additionally, the touch controller 104 may be configured to detect touch inputs via a touchscreen 102. In other words, the touch controller 104 may be configured to send touch driving signals (TDS) to the touchscreen, receive touch sensing signals (TSS) in return from the touchscreen, process the TSS to determine coordinates of touch, and report them to the system on a chip 106. Then based on the touch data collected from scanning, the touchscreen may be used by the touch controller 104 to determine the coordinates of touch, and report them to the system on a chip 106. Then, the system on a chip 106 may provide an output to the touchscreen 102 based on the reported coordinates of touch.

Advantageously, as will be described in more detail below, embodiments of the present application disclose a touchscreen device configured to record and analyze multiple touch inputs across a plurality of frames based on merge criteria, and a method for determining whether to merge the touch inputs for reporting. In other words, the multiple touch inputs can be merged and reported as one touch input or split and reported as separate touch inputs.

FIG. 1B illustrates a schematic of the touchscreen 102. In various embodiments, the touchscreen 102 may include a touch sensing layer 116 and a display layer 118. The touch sensing layer 116 and the display layer 118 may be situated on the front facing side of the electronic device 100. The touch sensing layer 116 is configured to detect touch inputs made on the touchscreen 102.

The touch sensing layer 116 includes a plurality of TX channels and RX channels arranged in rows and columns across the touchscreen 102. The TX channels and the RX channels form the touch sensing layer. The TX channels and RX channels may span the entirety of the touchscreen 102 in a grid-like fashion that are operable by a touch controller. In various embodiments, the TX channels may be formed in rows across the touchscreen and the RX channels 124 may be formed in columns across the touchscreen 102. In other embodiments, the RX channels 124 may be formed in rows across the touchscreen 102 and the TX channels 122 may be formed in columns across the touchscreen 102. The TX channels 122 and the RX channels 124 may overlap in certain embodiments.

The TX channels and the RX channels may be formed by electrically coupling the touchscreen 102 to rows of capacitive electrodes and columns of capacitive electrodes that span the entirety of the touchscreen 102. In various embodiments, the TX channels and the RX channels have a measurable mutual capacitance at their intersections. In some embodiments, the TX channels and the RX channels may have a self-capacitance that can be measured with respect to ground.

The touch controller 104 is coupled to the TX channels and the RX channels that form the touch sensing layer 116. The TX channels 122 and the RX channels 124 create a matrix of intersections that act as individual touch sensors. The touch controller 104 sends electrical signals through the TX channels and measures the changes in capacitance at each intersection point through the RX channels. The touch controller detects and locates touch events by analyzing the changes in capacitance across the entire grid. The touch events may include a finger touch, stylus or pen touch, or any contact with that touchscreen 102 that changes the capacitance in the touch sensing layer 116. For convenience, these are all referred to as a touch input herein. The touch controller 104 can processes this raw data, filters out noise, and interpret the touch inputs, translating them into coordinates and gestures that the device's operating system can understand. This integration between the touch controller and the sensor grid enables accurate and responsive touch detection.

Figure 2A:
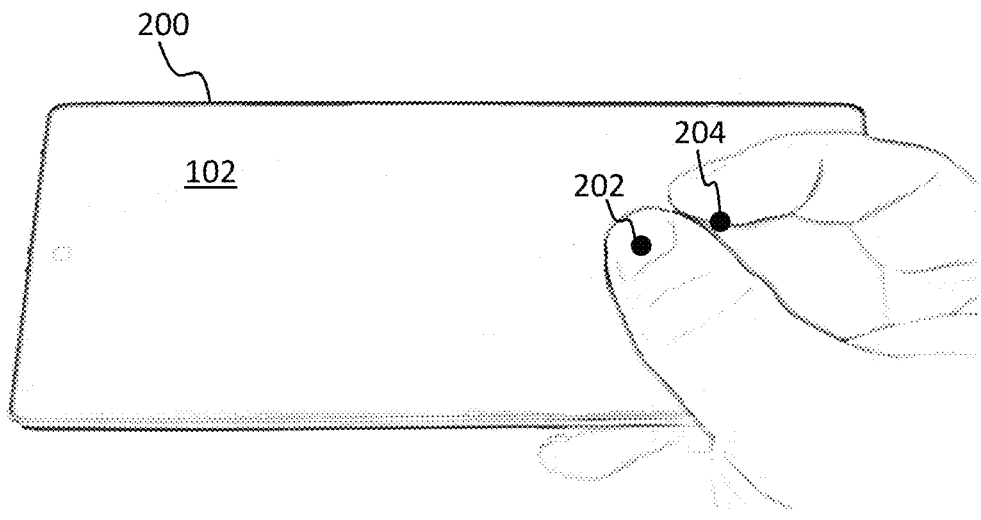
FIGS. 2A-2C illustrate touch input detection and processing of an electronic device according to an embodiment of the present application.
Figure 2B:
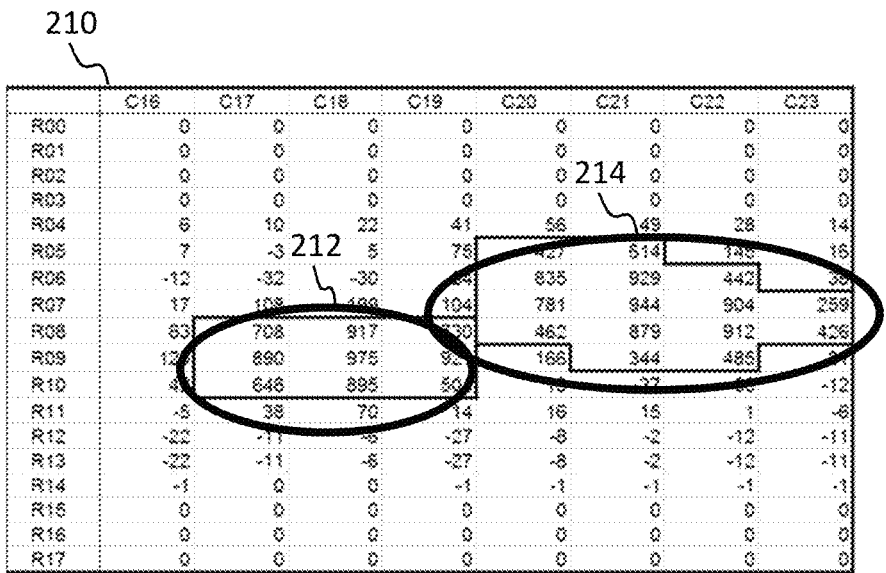
Figure 2C:
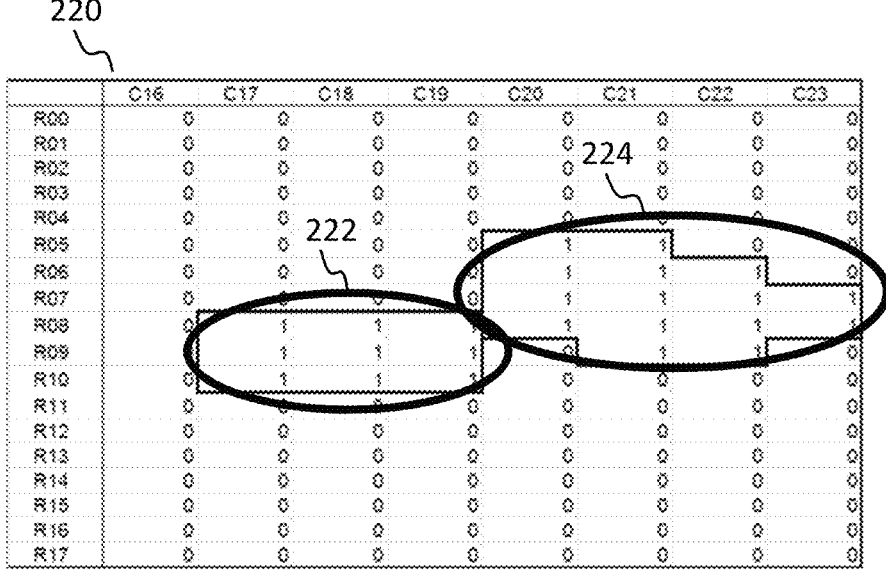

FIGS. 2A-2C illustrate touch input detection and processing of an electronic device according to an embodiment of the present application. FIGS. 2A-2C will be described in conjunction with FIGS. 1A-1B.

Referring to FIG. 2A, an electronic device 200 includes a touchscreen 102. In one or more embodiments, multiple touch inputs 202, 204 may be in contact with the touchscreen 102. In one or more embodiments, the multiple touch inputs include a first touch input 202 and a second touch input 204 can be in a same area of the touchscreen. In other words, the first touch input 202 can be proximate to the second touch input 204 or the first touch input 202 and the second touch input 204 can be adjacent touch inputs.

When a touch input is detected on the touchscreen 102, the touch controller 104 detects and locates the touch inputs on the touchscreen 102 based on the changes in capacitance. The touch controller 104 generates a strength bitmap 210 of the changes in capacitance for each frame as shown in FIG. 2B. Each frame of the strength bitmap 210 provides a snapshot of the touch coordinates of touch inputs and signal strengths that can be recorded and analyzed across sequential frames to track touch movement and determine appropriate merge conditions. In one or more embodiments, the touch controller 104 creates a touch bitmap 220 that corresponds to the strength bitmap 210. The touch bitmap 220 shows a positive touch value to each touch node having a strength value greater than a strength threshold and a zero-touch value to each node having a strength value less than the strength threshold as shown in FIG. 2C.

Referring to FIG. 2B, the strength bitmap 210 shows a first cluster of strength values 212 for touch nodes corresponding to the first touch input 202 and a second cluster of strength values 214 for touch nodes corresponding to the second touch input 204 on the touchscreen 102. The touch nodes on the strength bitmap 210 corresponds to the adjacent touch inputs shown in FIG. 2A. In one or more embodiment, the adjacent touch inputs have at least one touch node in the first cluster of strength values 212 that is adjacent to at least one touch node of the second cluster of strength values 214. The first cluster of strength values 212 include positive values where the first touch input 202 is in contact with the touchscreen 102. The second cluster of strength values 214 include positive values where the second touch input 204 is in contact with the touchscreen. The strength bitmap 210 may be used by the touch controller 104 to determine whether to merge multiple touch inputs.

In one or more embodiments, the strength bitmap 210 shows touch nodes of the touch inputs and a magnitude of the change in capacitance from the touch inputs on a touchscreen 102. The strength bitmap 210 is a digital representation of the touchscreen 102. As discussed in FIG. 2A, the touch controller 104 detects and locates touch events by analyzing the changes in capacitance across the entire grid.

In one or more embodiments, the touch controller 104 outputs raw data for each touch node that indicates the changes in capacitance where a touch event is located on the strength bitmap 210. The touch event may correspond to an interactive area on the touchscreen. The interactive area may correspond to a user interface element, for example, a button, slider, or the like. The raw data output comprises a matrix of strength values that represent capacitance measurements across the touchscreen 102. The strength bitmap 210 may be in the form of a two-dimensional array, where each element corresponds to a specific intersection point of the TX channels and RX channels on the touchscreen 102. Each strength value in the array represents the measured capacitance or change in capacitance at that particular intersection.

In one or more embodiments, the strength values may include both positive and negative values. Positive strength values may represent an increase in capacitance which could be caused, for example, by a finger. Negative strength values may represent a decrease in capacitance, which can occur around the edges of a touch event or due to environmental factors. The magnitude of these strength values correlates with the strength of the touch or the amount of interference. Larger positive strength values indicate a stronger touch or more significant presence of a conductive object. The strength values also capture information about multiple simultaneous touches, allowing for multi-touch functionality. Each touch point may appear as a cluster of changed strength values in the data matrix. The strength bitmaps may display the data output for the strength values in grayscale or in color to represent touch intensity.

Referring to FIG. 2C, the touch bitmap 220 shows a first touch island 222 representing the first cluster of strength values 212 that correspond to the first touch input 202 and a second touch island 224 representing the second cluster of strength values 214 that correspond to the second touch input 204 on the touchscreen 102. The touch bitmap 220 corresponds to the strength bitmap 210 shown in FIG. 2B. In various embodiments, a touch bitmap 220 can be created and recorded for each frame based on the strength values on the strength bitmap 210. Each frame of the touch bitmap 220 can be recorded and analyzed across sequential frames to determine merge conditions.

In one or more embodiments, the touch bitmap 220 shows binary values, 0 or 1, that represent strength values on the touch nodes of the strength bitmap 210 compared to a strength threshold. Each touch node with a strength value greater than a strength threshold may be assigned '1' and each touch node with a strength value less than the strength threshold may be assigned '0'. In the illustrated example, the strength threshold may be +250. While the strength threshold has a value of 250, the strength threshold may vary for different devices or projects that require different touch strengths. For example, the strength thresholds may be 100, 150, 200, etc. for different projects.

In one or more embodiments, the touch islands on touch bitmap 220 represents the spatial distribution of each touch input. The touch controller 104 can store the touch bitmaps in memory 110 for multiple sequential frames to enable analysis of multiple touch inputs and overlapping touch node patterns across frames. The touch controller 104 can use the touch islands on the touch bitmap to determine whether to report the touch inputs as separate touch coordinates (e.g., split coordinates) or a single touch coordinate (e.g., merged coordinates) to the system on a chip 106.

Figure 3A:
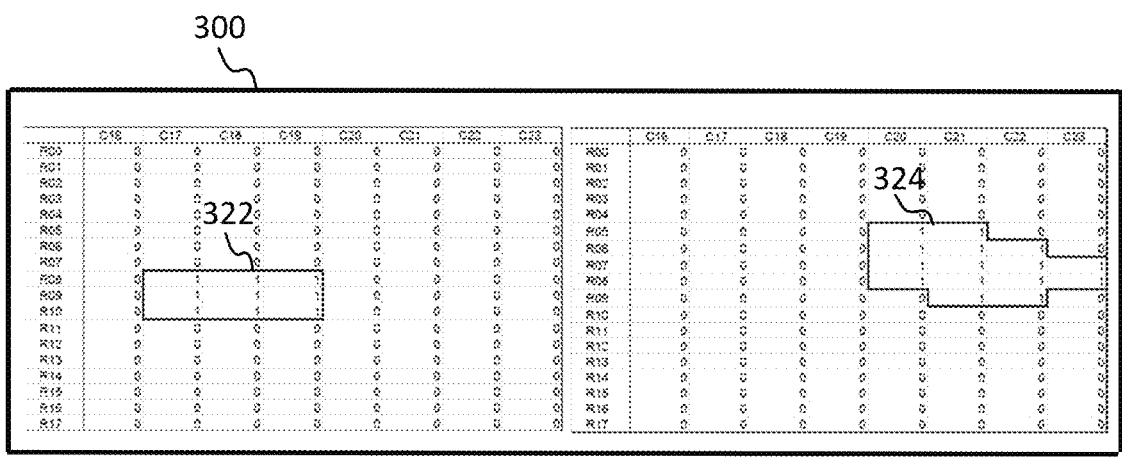
FIGS. 3A-3C illustrate touch bitmaps for multiple touch inputs on an electronic device according to an embodiment of the present application.
Figure 3B:
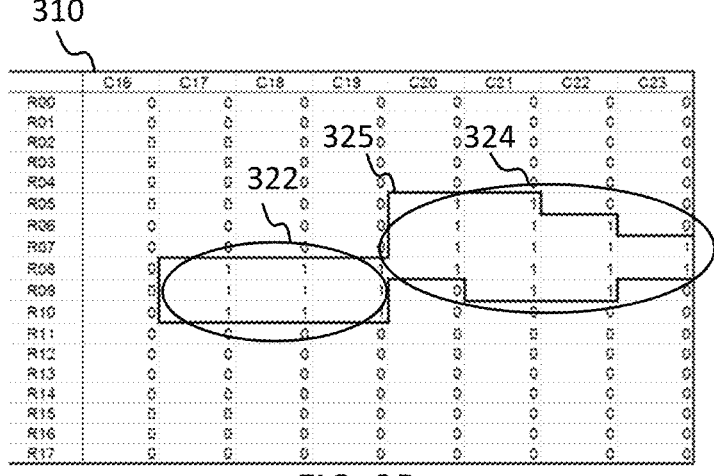
Figure 3C:
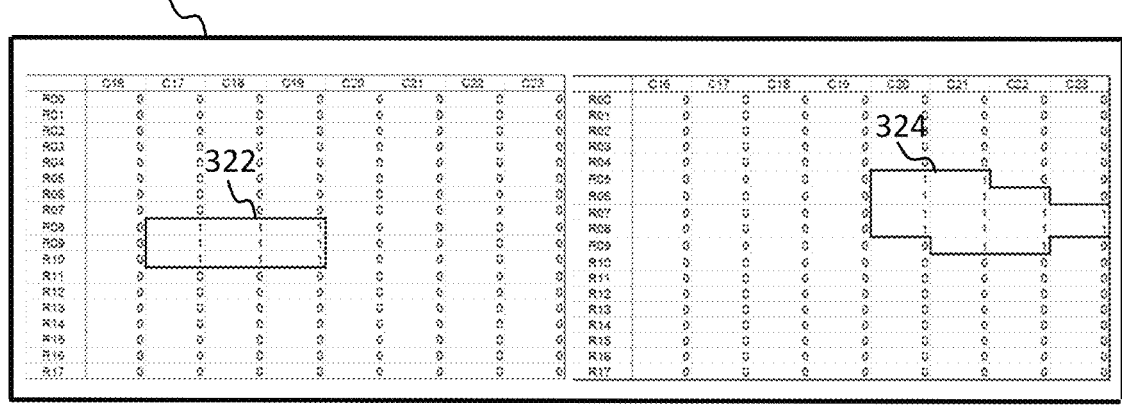

FIGS. 3A-3C illustrate touch bitmaps for multiple touch inputs on an electronic device according to an embodiment of the present application. FIGS. 3A-3C will be described in conjunction with FIGS. 1A-1B. The touch bitmaps represent touch input processing across sequential frames according to various embodiments.

FIGS. 3A-3C show touch bitmaps 300, 310, 320 for sequential frames N−2, N−1, N. In various embodiments, the sequential frames N−2, N−1, N may be referred to as a current frame (e.g., N), a preceding frame (e.g., N−1), previous frames (e.g., N−1, N−2), or next frame (e.g., N+1, N+n). In other embodiments, the sequential frames N−2, N−1, N may be referred to numerically, for example, as a first frame (e.g., N−2), a second frame (e.g., N−1), and a third frame (e.g., N).

In one or more embodiments, when multiple touch inputs are detected on a touchscreen 102, the touch islands may be split so that the touch inputs are reported as separate touch coordinates for some frames or merged so that the touch inputs are reported as a single touch coordinate for other frames. For example, when two touch inputs are stationary for a plurality of frames, the stationary touch inputs may be inconsistently reported as a single touch coordinate and as two separate coordinates in different frames. In various embodiments, separate touch coordinates may be referred to as split coordinates and a single touch coordinate may be referred to as a merged coordinate. The touch bitmaps 300, 310, 320 show the touch islands corresponding to the reported touch coordinates for the sequential frames N−2, N−1, N.

FIG. 3A shows the touch bitmap 300 for a first frame N−2. The touch bitmap 300 shows separate touch islands or split islands 322, 324 that are reported as separate touch coordinates in the first frame N−2. FIG. 3B shows the touch bitmap 310 for second frame N−1. The touch bitmap 310 shows separate touch islands 322, 324 that are reported as a single or merged touch coordinate 325 in the second frame N−1. FIG. 3C shows the touch bitmap 320 for a third frame N. The touch bitmap 320 shows separate touch islands 322, 324 that are reported as separate touch coordinates in the third frame N.

In one or more embodiments, the touch controller 104 detects a plurality of touch inputs for a plurality of frames on a touchscreen of an electronic device. In one or more embodiments, the touch controller 104 records the touch inputs on a touch bitmap for each frame and stores the recorded touch bitmaps in memory 110. In one or more embodiments, the touch controller 104 can utilize the touch bitmaps of previous frames to determine whether the touch inputs and the touch islands have met at least one merge criteria for a current frame. For example, the touch bitmaps 300, 310, 320 for the sequential frames N−2, N−1 can be utilized to determine whether to merge the touch inputs of the frame N−1, and the sequential frames N−1, N can be utilized to determine whether to merge the touch inputs of the frame N.

In one or more embodiments, the touch controller 104 can compare the touch nodes of a current frame N with the touch nodes of a preceding or previous frame N−1. The touch controller 104 can continuously evaluate the touch nodes of the current frame N and compare the touch nodes of the current frame N with the touch nodes of the previous frame N−1 to determine whether merge criteria has been met. For example, criteria for merging the touch inputs on the current frame N based on the preceding frame N−1 can include determining whether the touch inputs on the preceding frame N−1 have been merged to a single touch coordinate, determining a number of touch nodes in the current frame N that overlap with the touch nodes in the preceding frame N−1, and determining a speed (i.e., change in distance and time) between the touch inputs in the preceding frame N−1 and corresponding touch inputs in the current frame N. When one or more merge criteria is met, the touch controller 104 merges the touch inputs in the current frame N to a single touch coordinate.

Figure 4:
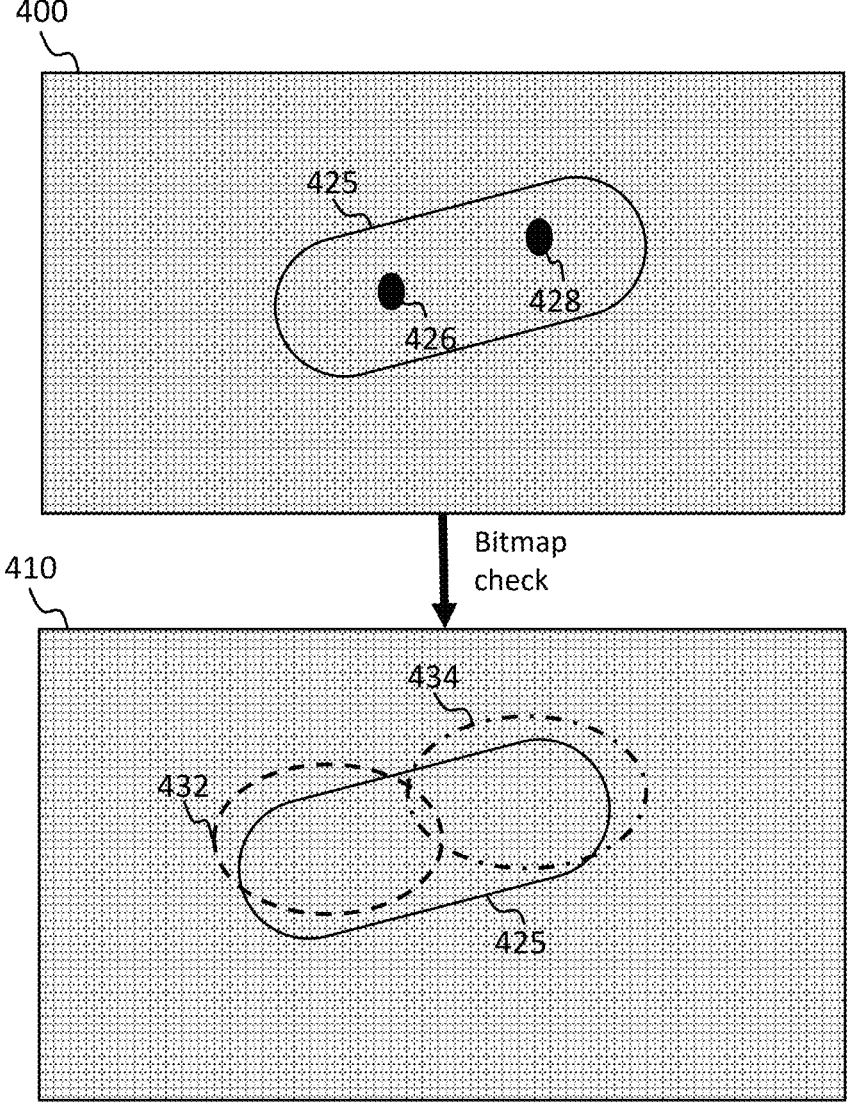
FIG. 4 illustrates a merge analysis according to an embodiment of the present application.

FIG. 4 illustrates a merge analysis according to an embodiment of the present application. FIG. 4 will be described in conjunction with FIGS. 1A and 3A-3C. The merge analysis shows touch input processing between a recorded frame 400 for a preceding or previous frame and a bitmap check 410 for a current frame according to various embodiments.

In one or more embodiments, each touch input on the previous frame N−1 is recorded and stored in memory 110 to be utilized to determine whether to merge the touch inputs on the current frame. The recorded frame 400 for the previous frame N−1 shows a first touch input 426, a second touch input 428, and a merged touch island 425. The first touch input 426 includes a corresponding first touch island and the second touch input 428 includes a corresponding second touch island that is adjacent to the first touch island. The first touch island and the second touch island can be combined to the merged touch island 425 based on a recorded frame (not shown) preceding the previous frame N−1.

The bitmap check 410 shows a first touch island 432 of the current frame N, a second touch island 434 of the current frame N, and the merged touch island 425 of the previous frame N−1. When the bitmap check 410 indicates that a touch island of the current frame N overlaps with the merged touch island 425 of the previous frame N−1 by more than an overlap threshold, the touch controller 104 assigns a touch index from the previous frame N−1 as a merge identifier or merge ID to the touch island of the current frame N. The overlap threshold may be between 60% and 90%, e.g., 75%. The touch index is a numerical identifier assigned to each individual touch input detected by the screen that allows the system to differentiate between each finger touching the screen simultaneously. For example, when a user touches the touchscreen 102 at five different points in a given frame, the touch controller 104 may allocate, for that frame, touch indices of 01, 02, 03, 04, and 05 respectively to each user touch.

When the touch inputs are merged to a merged touch coordinate in the previous frame N−1, the touch index of the merged touch coordinate can be assigned as the merge ID on the current frame. For example, if the first touch input 426 has a touch index of 01 in the previous frame N−1, the second touch input 428 has a touch index 02 in the previous frame N−1, the first touch input 426 and the second touch input 428 is merged in the previous frame N−1, and the first touch input 426 is the reported merged touch coordinate in the previous frame N−1, each touch input on the current frame N can be assigned 01 as the merge ID if the overlap for that touch input exceeds the overlap threshold. In one or more embodiments, the touch controller 104 determines an overlap percentage of overlapping touch nodes on the touch bitmap of the current frame N and touch bitmap of the previous frame N−1. For example, the overlap percentage for the touch input can be calculated using the formula $$\frac{A \cap B}{A},$$

where A is the number of touch nodes in the touch island in the current frame N and B is the number of touch nodes in the merged touch island in the previous frame N−1. The touch controller 104 assigns a merge ID to the touch island on the current frame N based on the overlap percentage of the touch nodes. When the touch islands of the current frame N and the previous frame N−1 overlap by more than an overlap threshold, the merge ID assigned to the touch island on the current frame N may be a touch index of the previous frame N−1. Following the example above, if the first touch island 432 on the current frame N has an overlap percentage that exceeds the overlap threshold, the touch controller 104 assigns the touch index 01 as the merge ID for the first touch island 432 in the current frame N. If the second touch island 434 has an overlap percentage that exceeds the overlap threshold, the touch controller 104 assigns the touch index 01 as the merge ID for the second touch island 434 in the current frame N.

When the merge IDs for the touch islands match on the current frame N, the touch controller 104 merges the touch islands 432, 434 and reports the corresponding touch inputs as a merged touch coordinate to the system on a chip 106. Following the example above, the merge ID for the first touch island is 01 and the merge ID for the second touch island is 01, the touch controller 104 can merge the touch islands 432, 434 on the current frame and report the corresponding touch inputs as a merged touch coordinate to the system on a chip 106.

When the merge IDs on the current frame N have the touch index of the previous frame N−1, this may indicate that the touch input has not significantly changed between frames. When the merge ID for two or more touch islands on the current frame N are the same, excluding touch islands that are assigned the default merge ID, the touch controller 104 merges the touch islands to a single touch island and reports the touch inputs as a merged touch coordinate to the system on a chip 106. When the touch islands of the current frame N and the previous frame N−1 overlap by less than the overlap threshold, the merge ID assigned to the touch island on the current frame N may be a default merge ID (e.g., touch index 255). When the merge ID for two or more touch islands on the current frame N are assigned the default merge ID, the touch controller 104 does not merge the touch islands and reports the touch inputs as a separate touch coordinate to the system on a chip 106.

The touch controller 104 continues to evaluate the touch bitmaps and the merge IDs across the frames. The continuous evaluation of this merge criterion can provide stable touch coordinate reporting while allowing appropriate touch separation when conditions change. In the absence of this algorithm, the touch controller 104 may report a merged touch, followed by a two separate touches, followed again by a merged touch, and so on. This instability could then make subsequent downstream processing to be unstable/inaccurate.

Figure 5A:
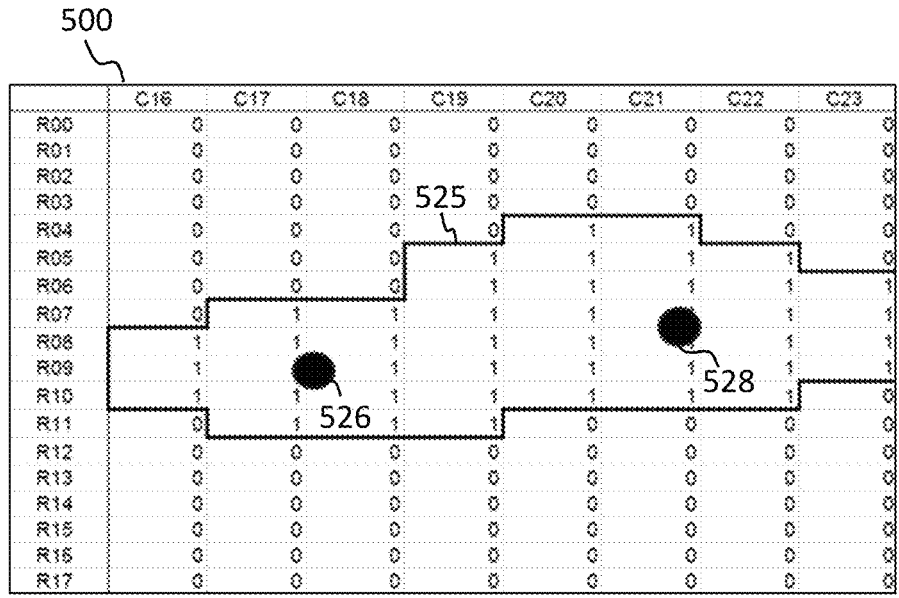
FIGS. 5A-5B illustrate touch bitmaps for multiple touch inputs on an electronic device according to an embodiment of the present application.
Figure 5B:
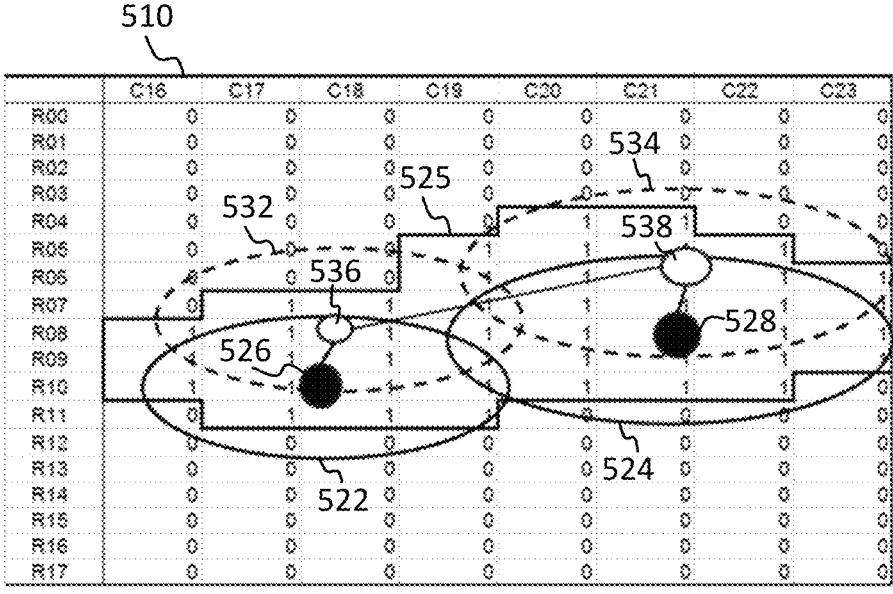

FIGS. 5A-5B illustrate touch bitmaps for multiple touch inputs on an electronic device according to an embodiment of the present application. FIGS. 5A-5B will be described in conjunction with FIG. 1A. The touch bitmaps represent touch input processing across sequential frames according to various embodiments.

In one or more embodiments, the touch controller 104 compares the touch bitmaps between frames and determines whether the touch inputs and touch islands of the current frame N meet one or more criteria to merge. The merge criteria may include matching merge IDs, speeds between touch inputs that are below a speed threshold, distances between touch inputs that are below a distance threshold, or any combination thereof. For example, merged touch input on a previous frame N−1 may remain merged in the current frame N when the merge IDs match, when the speed of the touch inputs between frames is less than a speed threshold, or when the distance between the touch inputs is less than a distance threshold. If any criterion is not met, for example, non-matching merge IDs, the speeds exceed the speed threshold, and the distance exceed the distance threshold, the previously merged touch inputs may be split and reported as two separate touch inputs.

FIG. 5A shows a touch bitmap 500 for a previous frame N−1. The touch bitmap 500 shows a first touch input 526, a second touch input 528, and a merged touch island 525 of a previous frame N−1.

FIG. 5B shows a touch bitmap 510 for a current frame N and the previous frame N−1. The touch bitmap 510 shows, for the previous frame N−1, the first touch input 526, a first touch island 522 for the first touch input 526, the second touch input 528, a second touch island 524 for the second touch input 528, and the merged touch island 525 of the previous frame N−1. The touch bitmap 510 also shows, for the current frame N, a first touch input 536, a first touch island 532 for the first touch input 536, a second touch input 538, and a second touch island 534 for the second touch input 538. The first touch input 526 from the previous frame N−1 and the first touch input 536 from the current frame N may be, for example, a finger touch on the touchscreen 102 that is held on the touchscreen 102 for at least two frames. While the inventive aspects are described primarily in the context of a first touch input and a second touch input, it should also be appreciated that these inventive aspects may also apply to two or more touch inputs.

Referring to FIG. 5B, the touch bitmap 510 depicts merge criteria that the touch controller 104 can use to determine whether multiple touches should be merged. In one or more embodiments, the touch controller 104 determines whether merge IDs assigned to touch islands match, the speed of touch inputs between the previous frame N−1 and the current frame N is less than the speed threshold, or the distance between touch inputs in the current frame N are less than a distance threshold.

In one or more embodiments, a merge ID is assigned to the touch islands of the touch bitmap for each frame as described in FIG. 4. When the touch islands on the current frame N overlap with the touch islands on the previous frame N−1 by more than an overlap threshold, a touch index of the previous frame N−1 is assigned as the merge ID on the current frame N. When the merge ID for two or more touch islands are the same, the touch controller 104 determines that the touch inputs of the current frame N should be merged, merges the touch inputs to a single touch input, and reports the merged touch input as a single touch coordinate to the system on a chip 106.

For example, when the first touch island 532 and the second touch island 534 on the current frame N overlaps the first touch island 522 and the second touch island 524 on the previous frame N−1, the touch index of the previous frame is assigned as the merge ID for the first touch island 532 and the second touch island 534. When the first touch island 532 and the second touch island 534 have the same merge ID, the touch controller 104 merges the first touch island 532 and the second touch island 534 and reports the touch inputs as a merged touch coordinate to the system on a chip 106. When the merge ID for two or more touch islands are the different, the touch controller 104 determines that the touch inputs of the current frame N should be separate touch coordinates and reports each touch input as separate touch coordinates to the system on a chip 106.

In one or more embodiments, a speed is determined between the first touch input of the previous frame N−1 and the corresponding first touch input of the current frame N. The speed is a calculated based on a distance between the corresponding touch inputs and the time between the previous frame N−1 and the current frame N. For example, in FIG. 5B, the speed for the first touch input can be calculated based on the distance between the first touch input 526 of the previous frame N−1 and the first touch input 536 of the current frame N and the time between the previous frame N−1 and the current frame N. Similarly, the speed for the second touch input can be calculated based on the distance between the second touch input 528 of the previous frame N−1 and the second touch input 538 of the current frame N and the time between the previous frame N−1 and the current frame N.

When the calculated speeds are less than a speed threshold, the touch controller 104 determines that the touch inputs of the current frame N is likely to be a merged touch and should be merged after further check with distance condition, merges the touch inputs to a single touch input, and reports the merged touch input to the system on a chip 106. The speed threshold may be between 30 and 60 pixels per frame, e.g., 45 pixels per frame. Each frame may be measured in milliseconds based on a touch scan rate of the touch controller 104. For example, each frame may be 8.3 ms with a touch scan rate of 120 Hz. When at least one of the calculated speeds are greater than or equal to the speed threshold, the touch input having a speed greater than the speed threshold may be a new touch input that should not be merged with the other touch inputs after traditional merge check as a new touch. For example, when the speed for the first touch input is less than the speed threshold and the speed for the second touch input is greater than the speed threshold, the second touch input is likely to be a new separate touch input (e.g., subsequent touch or tap) instead of the same touch input recorded in the previous frame N−1 (e.g., a touch or tap held on the touchscreen during the previous frame N−1 and the current frame N).

In one or more embodiments, a distance is calculated between the touch inputs of the current frame N. The distance is determined between the first touch input of the current frame N and the second touch input of the current frame N. For example, the distance can be measured from the first touch input 536 and the second touch input 538.

When the distance is less than a distance threshold, the touch controller 104 determines that the touch inputs of the current frame N should be merged, merges the touch inputs to a single touch input, and reports the merged touch input to the system on a chip 106. The distance threshold may be between 50 and 100 pixels, e.g., 75 pixels. When the distance is greater than or equal to the distance threshold, one or both of the touch inputs may be a new touch input that should not be merged with the other touch input after traditional merge check as a new touch. For example, when the distance between the first touch input 536 and the second touch input 538 is greater than the distance threshold, at least one of the first touch input or the second touch input is likely to be a new separate touch input (e.g., subsequent touch or tap) instead of the same touch input recorded in the previous frame N−1 (e.g., a touch or tap held on the touchscreen during the previous frame N−1 and the current frame N).

In one or more embodiments, the touch controller 104 determines to merge the touch inputs of the current frame N when all merge criteria are met. For example, merged touch inputs on a previous frame N−1 may remain merged in the current frame N when the merge IDs for the touch islands match, the speed is less than a speed threshold, and the distance between the touch inputs is less than a distance threshold. If any criterion is not met, for example, the speeds exceed the speed threshold, the distance exceeds the distance threshold, or the merge IDs do not match, the previously merged touch inputs may be split and reported as two separate coordinates.

In one or more embodiments, when the touch inputs merge, the touch controller 104 may report a coordinate in between the first touch input 526 and the second touch input 528. For example, when the first touch input 526 and the second touch input 528 are merged at frame N, the touch controller 104 can report a coordinate at a mid-point between the first touch input 526 and the second touch input 528. The mid-point may be calculated using a centroid method based on the merged touch islands.

The touch controller utilizes the touch bitmaps to evaluate the touch inputs and previously recorded touch coordinates based on their spatial and temporal characteristics. The evaluation process enables stable coordinate reporting for merged touches and preserves the ability to separate distinct touch inputs.

Figure 6:
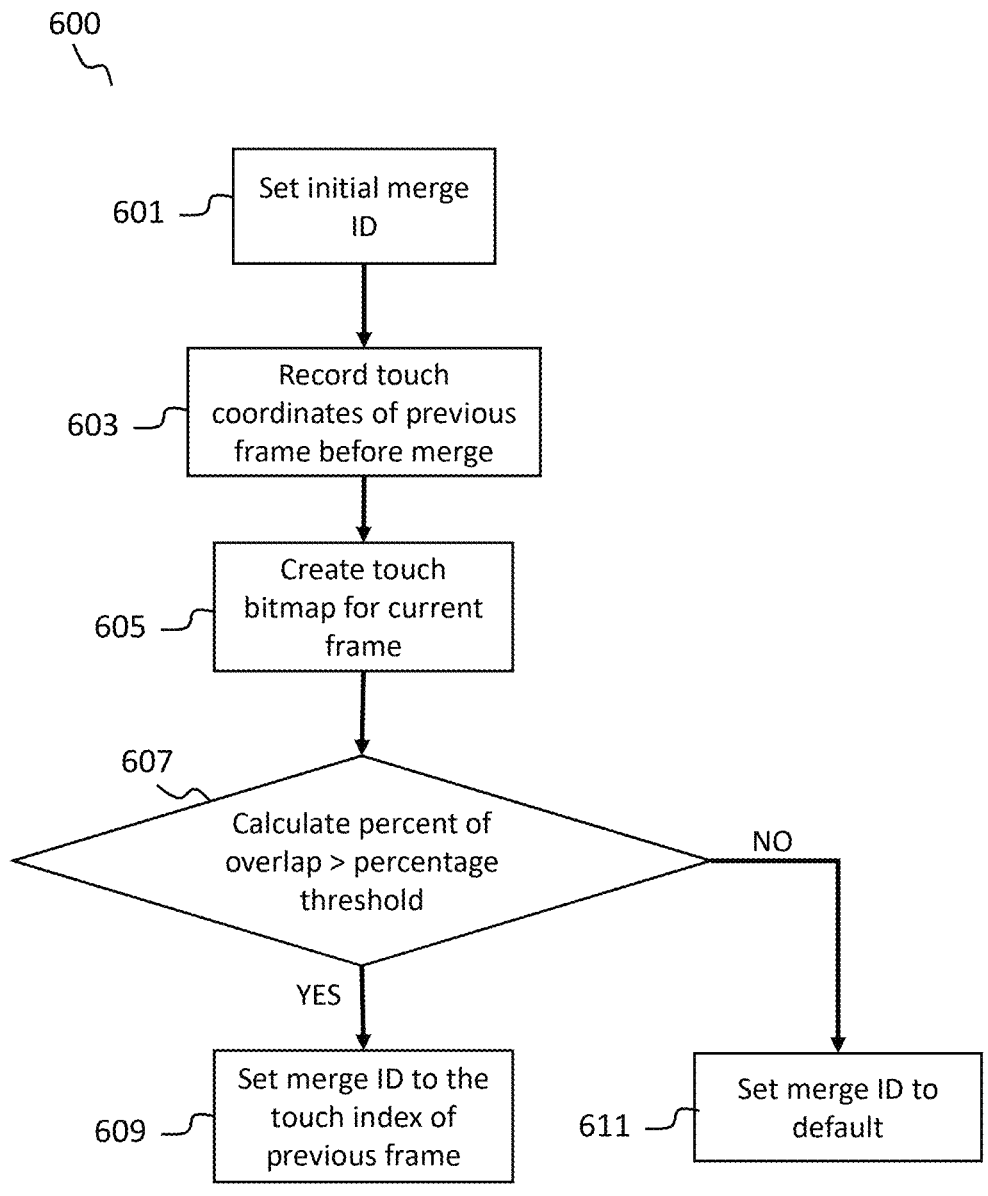
FIG. 6 illustrates a process flow 600 for assigning a merge ID according to an embodiment of the present application.

FIG. 6 illustrates a process flow 600 for assigning a merge ID according to an embodiment of the present application. The touch controller 104 performs the process flow for assigning the merge ID as described in FIG. 4.

In one or more embodiments, the process flow 600 for assigning the merge ID is performed for each frame. While the process flow 600 will be described in the context of a current frame, the process flow applies to previous frames and subsequent frames. The process begins by setting an initial merge ID to the current frame N in step 601. The initial merge ID may be a default merge ID. The default merge ID may be a touch index of 255.

In step 603, the touch controller 104 records unmerged touch islands and corresponding touch inputs of a previous frame N−1. The touch islands and touch inputs are stored in memory to be compared with the current frame. In step 605, the touch controller 104 creates a touch bitmap for the current frame. The touch bitmap is created from a strength bitmap for the current frame as described in FIG. 2C.

In step 607, the touch controller 104 calculates an overlap percentage for overlapping touch nodes on the touch bitmap of the current frame N created in step 605 and the touch bitmap of the previous frame N−1 recorded in step 603. In some embodiments, the touch controller 104 may calculate separate overlap percentages for each touch island that corresponds to each touch input. For example, the touch controller 104 may calculate a first overlap percentage for a first touch island on the current frame that overlaps with a first touch island on the previous frame and calculate a second overlap percentage for a second touch island on the current frame that overlaps with a second touch island on the previous frame. When the overlap percentage is calculated, the touch controller 104 determines whether the overlap percentage exceeds an overlap threshold.

When the overlap percentage exceeds the overlap threshold, the touch controller 104 assigns merge identifiers or merge IDs to the corresponding touch islands in step 609. In various embodiments, a first merge ID is assigned to the first touch island and a second merge ID is assigned to the second touch island based on the respective overlap percentages. The assigned merge ID may correspond to a touch index from the previous frame when sufficient overlap is detected. When the overlap percentage does not exceed the overlap threshold, the touch controller 104 assigns a default merge ID to the touch islands in the current frame in step 611.

The merge IDs provide a mechanism for tracking touch relationships across frames. In one or more embodiments, touch inputs sharing the same merge IDs can be merged. In other embodiments, touch inputs sharing the same merge IDs may be merged when additional merge criteria, such as speed and distance thresholds, are satisfied. The process flow repeats for each frame to maintain consistency in touch input tracking while allowing for dynamic merge analysis based on changing touch inputs.

Figure 7:
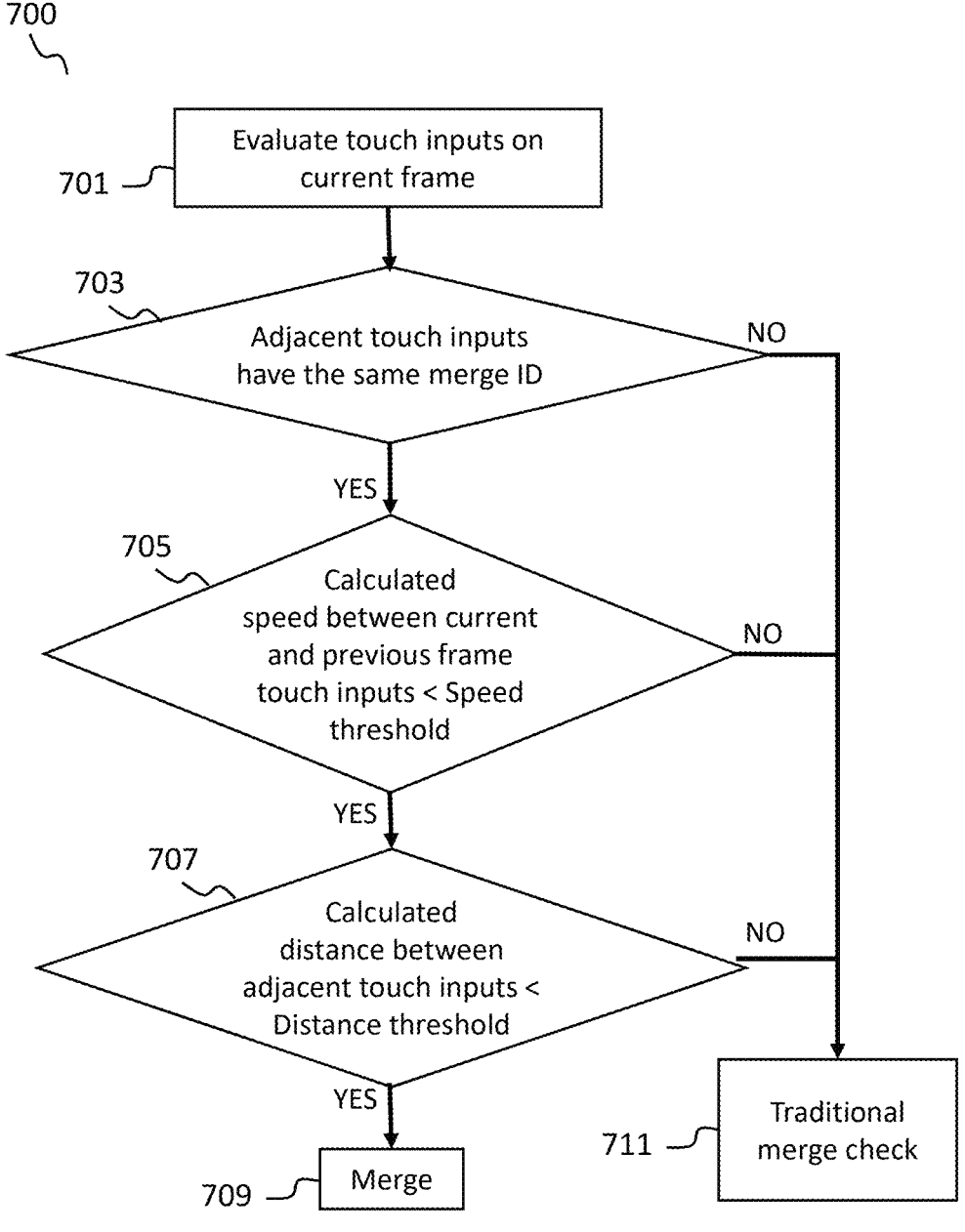
FIG. 7 illustrates a flow diagram 700 for merging multiple touch inputs according to an embodiment of the present application.

FIG. 7 illustrates a flow diagram 700 for merging multiple touch inputs according to an embodiment of the present application. The flow diagram 700 is a process flow for determining whether to merge touch inputs of a current frame. When the touch inputs of the current frame meet the merge criteria in the flow diagram 700, the touch controller 104 can merge the touch inputs.

In step 701, the touch inputs on the current frame are evaluated. In one or more embodiments, the evaluation of the touch inputs on the current frame includes determining whether merge IDs of adjacent touch inputs have a same merge ID, determining a speed between the adjacent touch inputs of the current frame and the adjacent touch inputs on a previous frame of the plurality of frames, and determining a distance between adjacent touch inputs on the current frame.

For example, when two touch inputs are detected on the current frame, the evaluation of the two touch inputs on the current frame includes determining whether merge IDs of the first touch input and the merge ID of the second touch input have a same merge ID, calculating a speed between the first touch input on the current frame and the first touch input on a previous frame, calculating a speed between the second touch input on the current frame and the second touch input on the previous frame, and calculating a distance between the first touch input and the second touch input on the current frame.

The evaluation of the touch inputs in step 701 can be used to determine whether the merge criteria is met. In step 703, a first merge criterion is met when the merge ID of the adjacent touch inputs are the same. In step 705, a second merge criterion is met when the calculated speed between the touch inputs on the current frame and the corresponding touch inputs on the previous frame is less than a speed threshold. In step 707, a third merge criterion is met when the calculated distance between the adjacent touch inputs on the current frame is less than a distance threshold. While the first, second, and third merge criteria in steps 703, 705, 707 are shown consecutively in the flow diagram 700, the steps may occur simultaneously or in a different order from the order shown in flow diagram 700.

When the first, second, and third merge criteria are satisfied, the touch inputs can be merged for the current frame in step 709. When one of the merge criteria is not satisfied, the touch controller 104 proceeds to perform a traditional merge check in step 711. The traditional merge check may include checking the current frame N based on distance, axis projection strength, island length, etc. In one or more embodiments, the touch inputs can be merged based on the traditional merge check.

Figure 8:
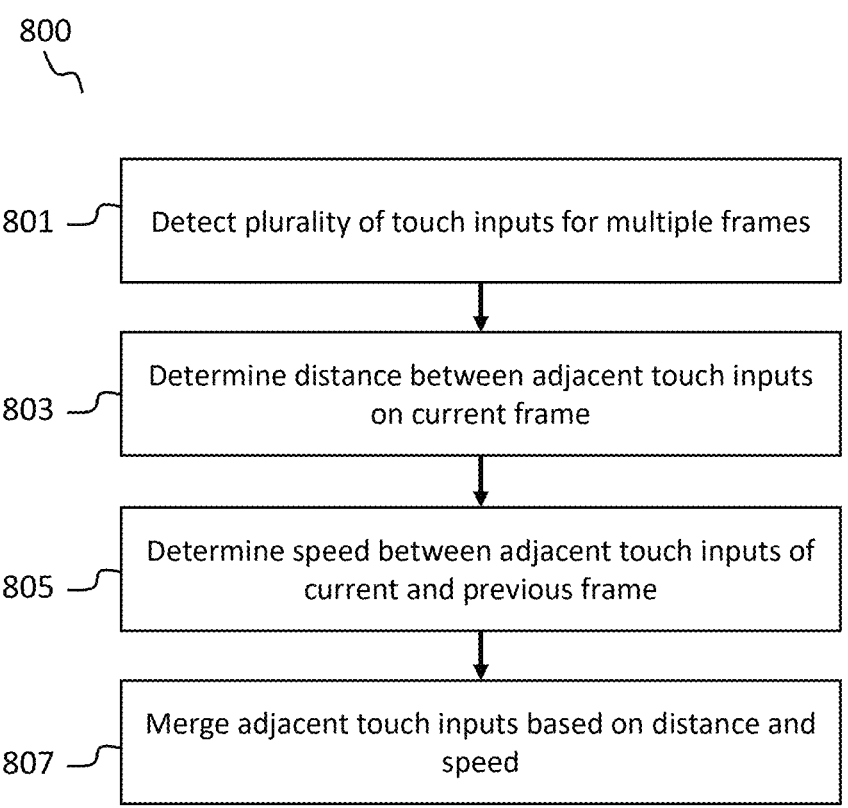
FIG. 8 illustrates a flow diagram of a method for processing touch inputs according to various embodiments.

FIG. 8 illustrates a flow diagram of a method for processing touch inputs according to various embodiments. At block 801, the touch controller 104 detects a plurality of touch inputs across multiple sequential frames on a touchscreen 102. The touch inputs may be detected through capacitive strength measurements on the touch sensing layer 116. At block 803, the touch controller 104 determines a distance between adjacent touch inputs detected on a current frame. In various embodiments, the distance calculation measures spatial separation between touch positions within the same frame to evaluate their proximity. At block 805, the touch controller 104 determines speeds between the adjacent touch inputs by comparing their positions in the current frame to corresponding positions in the previous frame. The speed calculations consider the distance between each touch and the time interval between frames. At block 807, the touch controller 104 merges the adjacent touch inputs based on the determined distance and speed. The adjacent touch inputs may merge into a single touch input when the distance is less than a distance threshold and the speeds are less than a speed threshold.

The touch input processing can improve touch stability, particularly for stationary or slow-moving touches in close proximity, while maintaining the ability to separate touches based on movement and position changes.

Example embodiments of the invention are described below. Other embodiments can also be understood from the entirety of the specification as well as the claims filed herein.

Example 1. A first example comprises a method of operating an electronic device. The method includes: detecting a plurality of touch inputs for a plurality of frames on a touchscreen of the device, the plurality of touch inputs comprising a first touch input and a second touch input, the first touch input being immediately adjacent to the second touch input from amongst the plurality of touch inputs, the plurality of frames comprising a current frame and a preceding frame; determining a distance between the first and the second touch inputs on the current frame; determining a speed between the first touch input on the current frame and the first touch input on the preceding frame; and merging, for the current frame, the first touch input with the second touch input into a single touch input based on the determined distance and the determined speed.

Example 2. The method of example 1, where determining the distance between the first and second touch inputs includes determining a distance between the first touch input on the current frame and the second touch input on the current frame.

Example 3. The method of examples 1 or 2, where determining the speed include: determining a first speed between the first touch input on the current frame and the first touch input on the preceding frame, where the first speed is a distance between the first touch inputs over a time between the current frame and the preceding frame; and determining a second speed between the second touch input on the current frame and the second touch input on the preceding frame, where the second speed is a distance between the second touch inputs over the time between the current frame and the preceding frame.

Example 4. The method of examples 1 to 3, where merging the first touch input with the second touch input based on the determined distance and determined speed includes: determining that the determined distance is less than a distance threshold; and determining that the determined speed is less than a speed threshold.

Example 5. The method of examples 1 to 4, where the distance threshold is between 50 and 100 pixels.

Example 6. The method of examples 1 to 5, where the speed threshold is between 30 and 60 pixels per frame.

Example 7. The method of examples 1 to 6, further includes: calculating a percentage of touch nodes on the current frame that overlaps with the touch nodes on the preceding frame; determining that the percentage exceeds an overlap threshold; and assigning merge IDs to the plurality of touch inputs on the current frame in response to the percentage exceeding the overlap threshold, where merging the first and the second touch inputs is further based on the first and the second touch inputs having a same merge ID.

Example 8. The method of examples 1 to 7, where calculating the percentage of touch nodes includes calculating a percentage of touch nodes of the first touch input on the current frame that overlaps with the touch nodes of the first touch input on the preceding frame and calculating a percentage of the touch nodes of the second touch input on the current frame that overlaps with the touch nodes of the second touch input on the preceding frame; and where assigning the merge IDs further comprises assigning a first merge ID to the first touch input and assigning a second merge ID to the second touch input.

Example 9. The method of examples 1 to 8, where determining the speed includes: determining a first speed between the first touch input on the current frame and the first touch input on the preceding frame in response to the first merge ID and the second merge ID being the same, where the first speed is a distance between the first touch inputs over a time between the current frame and the preceding frame; and determining a second speed between the second touch input on the current frame and the second touch input on the preceding frame in response to the first merge ID and the second merge ID being the same, where the second speed is a distance between the second touch inputs over the time between the current frame and the preceding frame.

Example 10. The method of examples 1 to 9, where determining a distance between the first touch input and the second touch input includes determining a distance between the first touch input and the second touch input on the current frame in response to the first speed being less than a speed threshold and the second speed being less than the speed threshold.

Example 11. The method of examples 1 to 10, where merging the first touch input with the second touch input includes merging the first touch input and the second touch input in response to the distance between the first touch input and the second touch input on the current frame being less than a distance threshold.

Example 12. A second example comprises a method including detecting a first touch input and a second touch input on a first frame, the first touch input being proximate to the second touch input; detecting the first touch input and the second touch input on a second frame; assigning merge IDs to the first touch input and the second touch input of the second frame; determining that the merge ID of the first touch input and the merge ID of the second touch input have a same merge ID; determining that a first speed of the first touch input between the first frame and the second frame is less than a first speed threshold; determining that a second speed of the second touch input between the first frame and the second frame is less than a second speed threshold; determining that a distance between the first touch input and the second touch input on the second frame is less than a distance threshold; and merging the first touch input and the second touch input on the second frame based on determining the merge ID, the first speed, the second speed, and the distance.

Example 13. The method of example 12, where assigning the merge IDs to the first touch input and the second touch input includes: calculating a percentage of the first touch input on the second frame that overlaps with the first touch input on the first frame; determining that the percentage for the first touch input exceeds a first overlap threshold; assigning a first merge ID to the first touch input in response to the percentage for the first touch input exceeding the first overlap threshold; calculating a percentage of the second touch input on the second frame that overlaps with the second touch input on the first frame; determining that the percentage for the second touch input exceeds a second overlap threshold; and assigning a second merge ID to the second touch input in response to the percentage for the second touch input exceeding the second overlap threshold.

Example 14. The method of examples 12 or 13, where determining the first speed comprises calculating a distance between the first touch input on the first frame and the first touch input on the second frame and a time between the first frame and the second frame and where determining the second speed comprises calculating a distance between the second touch input on the first frame and the second touch input on the second frame and the time between the first frame and the second frame.

Example 15. The method of examples 12 to 14, where determining the distance comprises measuring a distance between the first touch input on the second frame and the second touch input on the second frame.

Example 16. The method of examples 12 to 15, further includes: detecting the first touch input and the second touch input on a third frame when the first touch input and the second touch input merge on the second frame; assigning merge IDs to the first touch input and the second touch input of the third frame; determining that the merge ID of the first touch input on the third frame and the merge ID of the second touch input on the third frame have a same merge ID; determining that the first speed of the first touch input between the second frame and the third frame is less than the first speed threshold; determining that the second speed of the second touch input between the first frame and the second frame is less than the second speed threshold; determining that the distance between the first touch input and the second touch input on the third frame is less than the distance threshold; and merging the first touch input and the second touch input on the third frame based on determining the merge ID, the first speed, the second speed, and the distance.

Example 17. The method of examples 12 to 16, further includes: detecting the first touch input and the second touch input on a third frame when the first touch input and the second touch input merge on the second frame; and splitting the first touch input and the second touch input on the third frame when: a merge ID of the first touch input on the third frame and a merge ID of the second touch input on the third frame have different merge IDs; the first speed of the first touch input between the second frame and the third frame is greater than or equal to the first speed threshold; the second speed of the second touch input between the second frame and the third frame is greater than or equal to the second speed threshold; or the distance between the first touch input and the second touch input on the third frame is greater than or equal to the distance threshold.

Example 18. A third example comprises a device including a touchscreen, a touch controller, and a non-transitory memory storing a program to be executed by the touch controller. The program includes instructions to: detect a plurality of touch inputs for a plurality of frames on the touchscreen; record the plurality of touch inputs on a touch bitmap for each frame of the plurality of frames, each touch input having a touch island on the touch bitmap; assign merge IDs to each of the touch islands on the touch bitmap for each frame; determine that the touch islands in a current frame have a same merge ID; determine that a speed between the touch inputs on the current frame and the touch inputs on a previous frame is less than a speed threshold; determine that a distance between the touch inputs on the current frame is less than a distance threshold; and merge the touch inputs in response to the touch islands having the same merge ID, the speed being less than the speed threshold, and the distance being less than the distance threshold.

Example 19. The device of example 18, where assigning the merge IDs includes calculating a percentage of touch inputs on the touch bitmap of current frame overlaps with the touch inputs on the touch bitmap of the previous frame; determining that the percentage exceeds an overlap threshold; and assigning the merge IDs to the touch islands on the touch bitmap of the current frame in response to the percentage exceeding the overlap threshold.

Example 20. The device of examples 18 or 19, where the touch inputs include a first touch input and a second touch input, and where determining the speed between the touch inputs includes determining a first speed between the first touch input on the current frame and the first touch input on the previous frame, wherein the first speed is a distance between the first touch inputs over a time between the current frame and the previous frame, and determining a second speed between the second touch input on the current frame and the second touch input on the previous frame, wherein the second speed is a distance between the second touch inputs over the time between the current frame and the previous frame.

Example 21. The device of examples 18 to 20, where the touch inputs include a first touch input and a second touch input, and where determining the distance between touch inputs includes determining a distance between the first touch input and the second touch input on the current frame.

Example 22. A fourth example comprises a method that includes detecting a plurality of touch inputs for a plurality of frames on a touchscreen of the device, the plurality of touch inputs comprising a first touch input and a second touch input, the first touch input being immediately adjacent to the second touch input from amongst the plurality of touch inputs, the plurality of frames comprising a current frame and a preceding frame. The method further includes calculating a percentage of touch nodes on the current frame that overlaps with the touch nodes on the preceding frame, determining that the percentage exceeds an overlap threshold, assigning merge IDs to the plurality of touch inputs on the current frame in response to the percentage exceeding the overlap threshold, and merging, for the current frame, the first touch input with the second touch input into a single touch input based on the first and the second touch inputs having a same merge ID.

Example 23. The method of example 22, where calculating the percentage of touch nodes includes calculating a percentage of touch nodes of the first touch input on the current frame that overlaps with the touch nodes of the first and second touch inputs on the preceding frame and calculating a percentage of the touch nodes of the second touch input on the current frame that overlaps with the touch nodes of the first and second touch inputs on the preceding frame; and where assigning the merge IDs further comprises assigning a first merge ID to the first touch input on the current frame and assigning a second merge ID to the second touch input on the current frame.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating an electronic device, the method comprising:
   detecting a plurality of touch inputs for a plurality of frames on a touchscreen of the device, the plurality of touch inputs comprising a first touch input and a second touch input, the first touch input being immediately adjacent to the second touch input from amongst the plurality of touch inputs, the plurality of frames comprising a current frame and a preceding frame;
   determining a distance between the first and the second touch inputs on the current frame;
   determining a speed between the first touch input on the current frame and the first touch input on the preceding frame; and
   merging, for the current frame, the first touch input with the second touch input into a single touch input based on the determined distance and the determined speed.

2. The method of claim 1, wherein determining the distance between the first and second touch inputs comprises determining a distance between the first touch input on the current frame and the second touch input on the current frame.

3. The method of claim 1, wherein determining the speed comprises:

determining a first speed between the first touch input on the current frame and the first touch input on the preceding frame, wherein the first speed is a distance between the first touch inputs over a time between the current frame and the preceding frame; and determining a second speed between the second touch input on the current frame and the second touch input on the preceding frame, wherein the second speed is a distance between the second touch inputs over the time between the current frame and the preceding frame.

4. The method of claim 1, wherein merging the first touch input with the second touch input based on the determined distance and the determined speed comprises:

determining that the determined distance is less than a distance threshold; and determining that the determined speed is less than a speed threshold.

5. The method of claim 4, wherein the distance threshold is between 50 and 100 pixels.

6. The method of claim 4, wherein the speed threshold is between 30 and 60 pixels per frame.

7. The method of claim 1, further comprising:

calculating a percentage of touch nodes on the current frame that overlaps with the touch nodes on the preceding frame;

determining that the percentage exceeds an overlap threshold; and assigning merge IDs to the plurality of touch inputs on the current frame in response to the percentage exceeding the overlap threshold, wherein merging the first and the second touch inputs is further based on the first and the second touch inputs having a same merge ID.

8. The method of claim 7, wherein calculating the percentage of touch nodes comprises calculating a percentage of touch nodes of the first touch input on the current frame that overlaps with the touch nodes of the first and second touch inputs on the preceding frame and calculating a percentage of the touch nodes of the second touch input on the current frame that overlaps with the touch nodes of first and second touch inputs on the preceding frame; and wherein assigning the merge IDs further comprises assigning a first merge ID to the first touch input on the current frame and assigning a second merge ID to the second touch input on the current frame.

9. The method of claim 8, wherein determining the speed comprises:

determining a first speed between the first touch input on the current frame and the first touch input on the preceding frame in response to the first merge ID and the second merge ID being the same, wherein the first speed is a distance between the first touch inputs over a time between the current frame and the preceding frame; and determining a second speed between the second touch input on the current frame and the second touch input on the preceding frame in response to the first merge ID and the second merge ID being the same, wherein the second speed is a distance between the second touch inputs over the time between the current frame and the preceding frame.

10. The method of claim 9, wherein determining a distance between the first touch input and the second touch input comprises determining a distance between the first touch input and the second touch input on the current frame in response to the first speed being less than a speed threshold and the second speed being less than the speed threshold.

11. The method of claim 10, wherein merging the first touch input with the second touch input comprises merging the first touch input and the second touch input in response to the distance between the first touch input and the second touch input on the current frame being less than a distance threshold.

12. A method comprising:

detecting a first touch input and a second touch input on a first frame, the first touch input being proximate to the second touch input;

detecting the first touch input and the second touch input on a second frame;

assigning merge IDs to the first touch input and the second touch input of the second frame;

determining that the merge ID of the first touch input and the merge ID of the second touch input have a same merge ID;

determining that a first speed of the first touch input between the first frame and the second frame is less than a first speed threshold;

determining that a second speed of the second touch input between the first frame and the second frame is less than a second speed threshold;

determining that a distance between the first touch input and the second touch input on the second frame is less than a distance threshold; and merging the first touch input and the second touch input on the second frame based on determining the merge ID, the first speed, the second speed, and the distance.

13. The method of claim 12, wherein assigning the merge IDs to the first touch input and the second touch input comprises:

calculating a percentage of the first touch input on the second frame that overlaps with the first touch input on the first frame;

determining that the percentage for the first touch input exceeds a first overlap threshold;

assigning a first merge ID to the first touch input in response to the percentage for the first touch input exceeding the first overlap threshold;

calculating a percentage of the second touch input on the second frame that overlaps with the second touch input on the first frame;

determining that the percentage for the second touch input exceeds a second overlap threshold; and assigning a second merge ID to the second touch input in response to the percentage for the second touch input exceeding the second overlap threshold.

14. The method of claim 12, wherein determining the first speed comprises calculating a distance between the first touch input on the first frame and the first touch input on the second frame and a time between the first frame and the second frame and wherein determining the second speed comprises calculating a distance between the second touch input on the first frame and the second touch input on the second frame and the time between the first frame and the second frame.

15. The method of claim 12, wherein determining the distance comprises measuring a distance between the first touch input on the second frame and the second touch input on the second frame.

16. The method of claim 12, further comprising:

detecting the first touch input and the second touch input on a third frame when the first touch input and the second touch input merge on the second frame;

assigning merge IDs to the first touch input and the second touch input of the third frame;

determining that the merge ID of the first touch input on the third frame and the merge ID of the second touch input on the third frame have a same merge ID;

determining that the first speed of the first touch input between the second frame and the third frame is less than the first speed threshold;

determining that the second speed of the second touch input between the second frame and the third frame is less than the second speed threshold;

determining that the distance between the first touch input and the second touch input on the third frame is less than the distance threshold; and merging the first touch input and the second touch input on the third frame based on determining the merge ID, the first speed, the second speed, and the distance.

17. The method of claim 12, further comprising:

detecting the first touch input and the second touch input on a third frame when the first touch input and the second touch input merge on the second frame; and splitting the first touch input and the second touch input on the third frame when:

a merge ID of the first touch input on the third frame and a merge ID of the second touch input on the third frame have different merge IDs;

the first speed of the first touch input between the second frame and the third frame is greater than or equal to the first speed threshold;

the second speed of the second touch input between the second frame and the third frame is greater than or equal to the second speed threshold; or the distance between the first touch input and the second touch input on the third frame is greater than or equal to the distance threshold.

18. A device comprising:

a touchscreen;

a touch controller; and a non-transitory memory storing a program to be executed by the touch controller, the program comprising instructions to:

detect a plurality of touch inputs for a plurality of frames on the touchscreen;

record the plurality of touch inputs on a touch bitmap for each frame of the plurality of frames, each touch input having a touch island on the touch bitmap;

assign merge IDs to each of the touch islands on the touch bitmap for each frame;

determine that the touch islands in a current frame have a same merge ID;

determine that a speed between the touch inputs on the current frame and the touch inputs on a previous frame is less than a speed threshold;

determine that a distance between the touch inputs on the current frame is less than a distance threshold; and merge the touch inputs in response to the touch islands having the same merge ID, the speed being less than the speed threshold, and the distance being less than the distance threshold.

19. The device of claim 18, wherein assigning the merge IDs comprises:

calculating a percentage of touch inputs on the touch bitmap of current frame overlaps with the touch inputs on the touch bitmap of the previous frame;

determining that the percentage exceeds an overlap threshold; and assigning the merge IDs to the touch islands on the touch bitmap of the current frame in response to the percentage exceeding the overlap threshold.

20. The device of claim 18, wherein the touch inputs comprise a first touch input and a second touch input, and wherein determining the speed between the touch inputs comprises:

determining a first speed between the first touch input on the current frame and the first touch input on the previous frame, wherein the first speed is a distance between the first touch inputs over a time between the current frame and the previous frame; and determining a second speed between the second touch input on the current frame and the second touch input on the previous frame, wherein the second speed is a distance between the second touch inputs over the time between the current frame and the previous frame.

21. The device of claim 18, wherein the touch inputs comprise a first touch input and a second touch input, and wherein determining the distance between touch inputs comprises determining a distance between the first touch input and the second touch input on the current frame.

* * * * *